United States Patent
High, Jr. et al.

(10) Patent No.: US 7,124,192 B2
(45) Date of Patent: Oct. 17, 2006

(54) ROLE-PERMISSION MODEL FOR SECURITY POLICY ADMINISTRATION AND ENFORCEMENT

(75) Inventors: Robert Howard High, Jr., Round Rock, TX (US); Anthony Joseph Nadalin, Austin, TX (US); Nataraj Nagaratnam, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 698 days.

(21) Appl. No.: 09/943,618

(22) Filed: Aug. 30, 2001

(65) Prior Publication Data

US 2003/0046576 A1    Mar. 6, 2003

(51) Int. Cl.
  *G06F 15/16*  (2006.01)
  *G06F 7/00*   (2006.01)
  *G06F 17/30*  (2006.01)
(52) U.S. Cl. ............................ 709/229; 707/9; 713/165
(58) Field of Classification Search .................... 707/9, 707/103 R; 713/200–201, 165; 709/229
See application file for complete search history.

(56) References Cited

U.S. PATENT DOCUMENTS

| | | | | |
|---|---|---|---|---|
| 5,911,143 A * | 6/1999 | Deinhart et al. | ........ | 707/103 R |
| 6,088,679 A * | 7/2000 | Barkley | .......................... | 705/8 |
| 6,173,289 B1 * | 1/2001 | Sonderegger et al. | ... | 707/103 R |
| 6,202,066 B1 * | 3/2001 | Barkley et al. | ................. | 707/9 |
| 6,434,607 B1 * | 8/2002 | Haverstock et al. | ........ | 709/217 |
| 2002/0026592 A1 * | 2/2002 | Gavrila et al. | .............. | 713/201 |
| 2002/0031230 A1 * | 3/2002 | Sweet et al. | ................. | 380/278 |
| 2003/0088786 A1 * | 5/2003 | Moran et al. | ............... | 713/201 |
| 2003/0115487 A1 * | 6/2003 | Andrews et al. | ............ | 713/201 |

OTHER PUBLICATIONS

"Security" Chapter of The J2EE™ Tutoria, By Eric Jendrock, 17 pages.

* cited by examiner

*Primary Examiner*—Ayaz Sheikh
*Assistant Examiner*—Arezoo Sherkat
(74) *Attorney, Agent, or Firm*—A. Bruce Clay; Marcia L. Doubet

(57) ABSTRACT

Methods, systems, and computer program products are disclosed for protecting the security of resources in distributed computing environments. The disclosed techniques improve administration and enforcement of security policies. Allowed actions on resources, also called permissions, (such as invocations of particular methods, read or write access of a particular row or perhaps a particular column in a database table, and so forth) are grouped, and each group of permissions is associated with a role name. A particular action on a particular resource may be specified in more than one group, and therefore may be associated with more than one role. Each role is administered as a security object. Users and/or user groups may be associated with one or more roles. At run-time, access to a resource is protected by determining whether the invoking user has been associated with (granted) at least one of the roles required for this type of access on this resource.

18 Claims, 6 Drawing Sheets

---

500

Required Roles Table

| | | Granted Methods | | | | | |
|---|---|---|---|---|---|---|---|
| | | Account getBalance | Account deposit | Account closeAccount | AcctServlet HTTP_GET | /finance/account .GET | /public/* |
| Roles | Teller | yes | yes | | | yes | |
| | Cashier | yes | | | | | |
| | Super | | | yes | | yes | |
| | WebTeller | | | | yes | | |
| | PublicRole | | | | | | yes |

FIG. 3
(Prior Art)

Security Table

| Subjects | Granted Methods | | | |
|---|---|---|---|---|
| | Account getBalance | Account deposit | Account closeAccount | AcctServlet HTTP_GET |
| Teller | yes | yes | | |
| Cashier | yes | | | |
| Super | | | yes | |
| WebTeller | | | | yes |

FIG. 5

Required Roles Table 500

| | Granted Methods | | | | |
|---|---|---|---|---|---|
| Roles | Account getBalance | Account deposit | Account closeAccount | AcctServlet HTTP_GET | /finance/account .GET | /public/* |
| Teller | yes | yes | | | | |
| Cashier | yes | | | | | |
| Super | | | yes | | yes | |
| WebTeller | | | | yes | yes | |
| PublicRole | | | | | | yes |

FIG. 6

Protection Matrix *600*

| Subjects | Objects (Roles) | | | | |
|---|---|---|---|---|---|
| | Teller | Cashier | Super | WebTeller | PublicRole |
| TellerGroup | I | | | | |
| CashierGroup | | I | | | |
| Supervisor | | | I | | |
| Bob | I | I | I | I | |
| *Everyone* | | | | | I |

ROLE-PERMISSION MODEL FOR SECURITY POLICY ADMINISTRATION AND ENFORCEMENT

BACKGROUND OF THE INVENTION

1. Field of the Invention

The present invention relates to computer programming, and deals more particularly with methods, systems, and computer program products for protecting the security of resources in distributed computing environments. The disclosed techniques improve administration and enforcement of security policies.

2. Description of the Related Art

Use of distributed computing environments for e-commerce (or, equivalently, e-business in general) has skyrocketed in recent years. One well-known distributed computing environment is the public Internet (and the subset thereof known as the World Wide Web, or simply "Web"). Other distributed computing environments include intranets and extranets, where intranets are typically designed as computing networks for internal use within a business enterprise and extranets are typically designed for use by a business' suppliers and/or customers.

Protecting the security of resources in distributed computing environments is vital to the success of e-business initiatives. Few, if any, businesses put distributed computing applications into production without the assurance that their business processes and data are protected from malicious or inadvertent loss. A business may therefore implement security constraints for its network resources, where these security constraints may include (by way of illustration) ensuring that only authorized users are able to execute certain programs or certain functions of programs, or are able to access particular types of stored data, or perhaps are able to obtain Web pages which are retrieved using particular Uniform Resource Locator ("URL") addresses. As an example of restricting access to program functions, supervisors using an online banking application might be permitted to update account balance records, while tellers might be prevented from performing this function. As an example of restricting access to stored data, in an online personnel management application, managers might be permitted to view information about their employees' upcoming salary increases, whereas non-managerial employees would likely be restricted from seeing this information. Managers might also be allowed to view Web pages which present budget information, but non-managerial employees might be prevented from viewing these same pages.

On the other hand, there may be network resources which do not require protected access. For example, online shopping sites typically allow all users to browse their electronic catalogs, and online flight reservation sites normally allow all users to view information on flight arrival and departure schedules. In these types of business scenarios, resource protection is typically applied only after the user initiates particular types of transactions (such as ordering merchandise from the online catalog or making reservations on a certain flight).

Security policies are implemented to control access to an enterprise's resources, where these security policies are designed based on the types of resources and the need to protect each resource. In the online shopping and airline reservation scenarios, for example, choosing to allow unrestricted access up to a certain point may be thought to increase the likelihood of attracting new business.

In an enterprise containing thousands of deployed resources, the security administrator's job in designing and enforcing the security policy typically involves controlling access to each of these resources. With reference to an enterprise in which the Java™ programming language is used to develop applications, for example, the applications may use components based upon Enterprise JavaBean™ (also referred to as "EJBs"), Java Server Page™ (also referred to as "JSPs"), and servlets. In this environment, referred to hereinafter as a "J2EE™ environment", it is typically necessary to define the security policy at a level which enables protecting the methods of the EJBs and servlets, and the methods which are invoked from JSPs and when referencing each of the enterprise's Uniform Resource Identifiers or "URIs" (of which URLs are one subset). ("J2EE" is an acronym for "Java™ Platform, Enterprise Edition". The J2EE environment is used herein for purposes of illustration, but it is to be noted that the present invention is not limited to use in a J2EE environment. "Java", "JavaBeans", "JavaServer Pages", and "J2EE" are trademarks of Sun Microsystems, Inc.)

In an enterprise which may have thousands of EJBs (also referred to as "beans") installed, with potentially tens of methods in each bean, the sheer number of resources to be protected becomes too large for the security administrator to understand and to administer.

Similarly, for multiple portal applications, business-to-business or "B2B" applications, distributed web services environments, and content security considerations (that is, environments wherein the content of received data needs to be monitored), the number of resources to be managed under the security policies is too large for the security administrator to effectively control. At the same time, however, security concerns are continually increasing as hackers learn ways to penetrate security even at entities which would be expected to have tamper-proof systems.

Furthermore, an application in a modern computing system will often be composed of programming elements hosted on different middleware technologies—for example, a Teller application may be composed of static HTML (Hypertext Markup Language) pages, JSPs, servlets, EJBs, database tables and stored procedures, OLTP (online transaction processing) transactions, etc. Each of the middlewares contributing to the overall application will often impose their own technology assumptions, programming models, and representations. It may be necessary to specify the authorization policy for the Teller application in a number of different ways for each of the middlewares employed by the application—leading to potential inconsistencies and conflicting sub-policies.

Accordingly, what is needed is an improved technique for administering and enforcing security policy.

SUMMARY OF THE INVENTION

An object of the present invention is to provide an improved technique for administering and enforcing security policy in a distributed computing environment.

Another object of the present invention is to provide a technique for administering security policy using role-based access permissions.

Yet another object of the present invention is to provide a technique for enforcing security policy for each role instead of for each protected resource.

A further object of the present invention is to provide a technique for role-based access Still another object of the present invention is to provide a technique for administering security policy by defining a role as a set of permissions which are applicable to certain actions on particular resources.

Another object of the present invention is to provide a more efficient and more manageable technique for administering security policy.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for improving security policy administration using a role-permission model. In one embodiment, this technique comprises: identifying one or more groups of permitted actions on selected resources; assigning a name to each identified group; defining each assigned name to a security system as a security object; and associating subjects with each assigned name.

The assigned name is preferably a role name. The selected resources may be executable methods; columns of a database table; rows of a database table; or function calls to functions of one or more executable programs. As another alternative, the selected resources may be files, and the permitted actions may be file access operations. As yet another alternative, the selected resources may be EJBs, and the permitted actions may be methods on the EJBs. As still another alternative, the selected resources may be servlets and the permitted actions may be methods of the servlets. Or, the selected resources may be URIs, and the permitted actions may be methods which reference the URIs. And as another alternative, the selected resources may be JSPs, and the permitted actions may be methods referenced from the JSPs. And as another alternative, the selected resources may be any resource that is expressible to the security system and the permissions actions are selected from a set of actions that are permitted on those resources.

The technique may further comprise: receiving an access request for a particular one of the selected resources; determining one or more roles which are required for accessing the particular resource; determining an identity of a source of the access request; for each of the required roles, until obtaining a successful result or exhausting the required roles, determining whether the identity of the source is associated with the required role; and authorizing access to the particular resource only if the successful result was obtained. Determining the one or more roles preferably further comprises consulting a collection created from the identified permitted actions on the particular resource.

The present invention will now be described with reference to the following drawings, in which like reference numbers denote the same element throughout.

DESCRIPTION OF THE DRAWINGS

FIG. 3 provides a table corresponding to the role-privilege security model of FIG. 2;

DESCRIPTION OF PREFERRED EMBODIMENTS

The present invention defines techniques for improving administration and enforcement of security policies by using a novel implementation of a security policy model. Use of the techniques disclosed herein enables a consistent, consolidated approach to administering access control for all of the resources of an enterprise.

Figure 1:
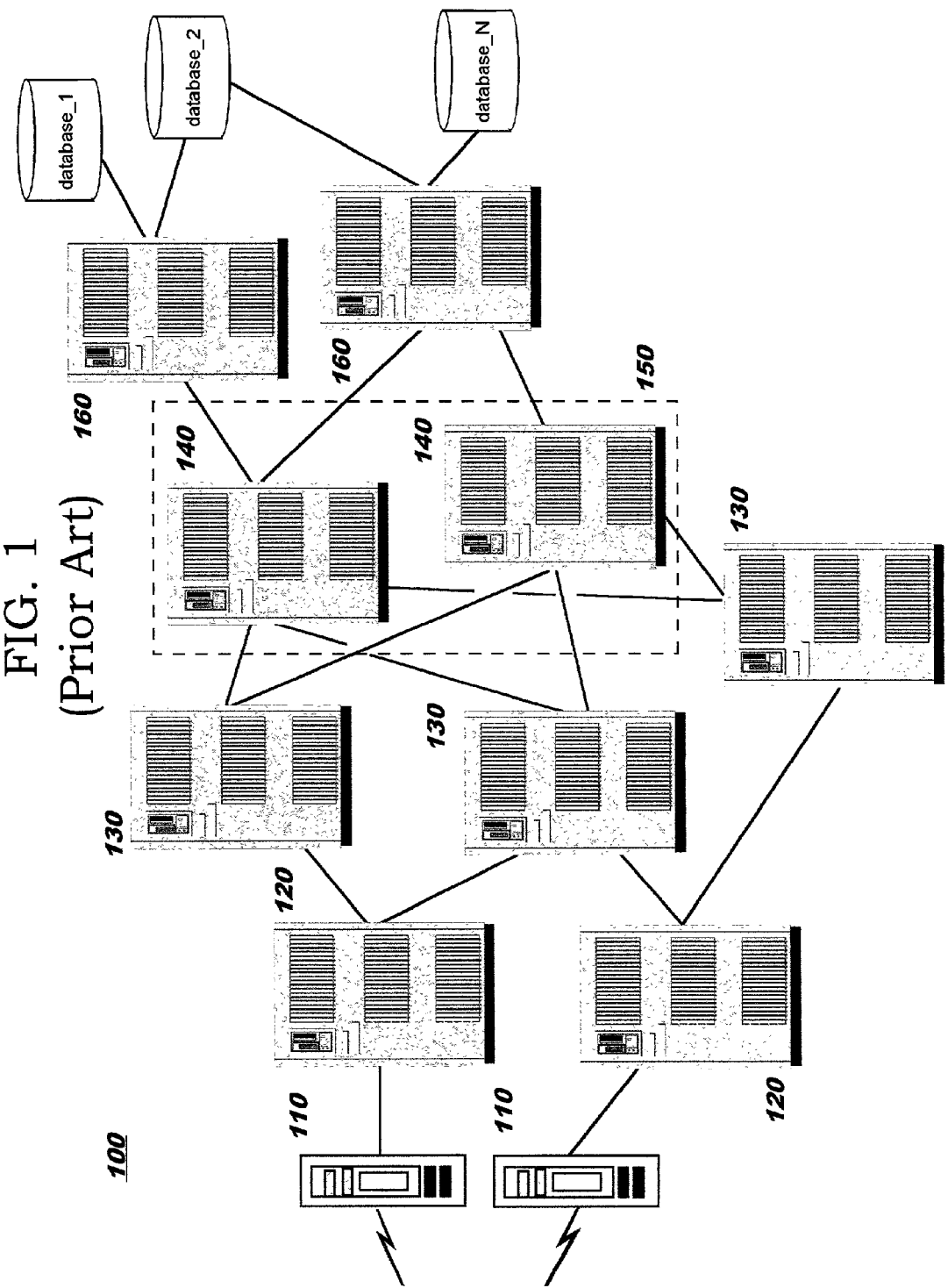
FIG. 1 is a diagram of a prior art network computing environment in which the present invention may be practiced.

FIG. 1 provides a diagram of a representative network computing environment 100 in which the present invention may be practiced. This example environment 100 comprises a cluster 150 of application servers 140 (such as IBM WebSphere® application servers); several back-end enterprise data servers 160 (such as IBM OS/390® servers running the DB/2®, CICS®, and/or MQI products from IBM); several Web servers 130 (such as Apache, Netscape, or Microsoft servers; note that the application server and Web server are often co-resident in a single hardware box); several firewalls 110; and several edge servers or reverse proxies/caches/load balancers 120. ("WebSphere", "DB/2", "OS/390", and "CICS" are registered trademarks of IBM.) As will be obvious, this network computing environment 100 is merely one example of a computing environment in which the present invention may be practiced, and environment 100 is provided for purposes of illustration and not of limitation.

The J2EE environment will be used to illustrate operation of preferred embodiments of the present invention and to contrast the present invention with the security policy administration techniques of the prior art. J2EE defines two primary elements of security: first, an API set for use within J2EE components (such as servlets, JSPs, and EJBs) for determining the requesting principal and the principal's association to a particular role, and second, a set of deployment descriptors for establishing authorization policies to J2EE components based on roles. J2EE does not define the authentication model to be used, APIs for establishing or manipulating security context, nor does it prescribe an implementation for roles-based authorization. The present invention defines novel techniques for providing roles-based authorization, as will be described in more detail hereinafter.

J2EE defines two relevant security methods for use by J2EE components. For EJBs, the methods are defined on an "EJBContext" object, and are named "getCallerPrincipal" and "isCallerInRole". For JSPs and servlets, the methods are defined on an "HTTPServletRequest" object, and are named "getUserPrincipal" and "isUserInRole". The details of these methods, and the manner in which they may be used in an application, are outside the scope of the present invention. However, these methods will be briefly discussed herein for purposes of describing the inventive concepts of the present invention.

The getCallerPrincipal or getUserPrincipal method can be used to get back a Java "Principal" object representing the requesting principal (that is, the entity or user which invoked an operation on a resource for which access control is being evaluated). The principal's security name can then be obtained from this Principal object (e.g. by invoking a "getName" method on the Principal object).

The isCallerInRole or isUserInRole methods take a string argument identifying a Role label, and can be used to determine whether the requesting principal has been associated in the specified Role.

In addition to the problems of having a huge number of security objects to manage, the Role labels specified within the body of a component implementation as arguments of isCallerInRole and isUserInRole methods are in most cases not very portable, and thus may hinder scalability and integration of components within an enterprise. For example, suppose a component is developed (and compiled) having code that checks for a "Manager" role. This component may be assembled with other components into an application, where those other components have a different notion of the Roles that are appropriate for that application. The other components may have been written, for example, to refer to a semantically similar role concept using the label "Supervisor". The person responsible for assembling the application from the components (referred to herein as the "application assembler") must then reconcile these different labels, and may want to use a different set of role labels which have already been defined to the security system and associated with the intended users of the application: consequently, the Role labels within the body of the component will be out of sync.

To compensate for this situation, J2EE defines deployment descriptors that can be included with each component to externally declare the bean labels that were referred to within that component. These declarations are captured in "Role Reference" descriptors. These Role Reference descriptors can then be used by the application assembler (and/or by the person responsible for deploying the application in the enterprise, who is referred to herein as the "application deployer") to map each referenced Role label to an actual Role defined for the assembled application. Use of Role Reference descriptors for this type of mapping is known in the art.

The J2EE security model (also referred to as the J2EE authorization model) of the prior art is based on defining security Roles against which permission to access specific methods on application components can be granted.

Permission policies for EJBs are specified in "Method-Permission" descriptors. A method-permission descriptor defines the methods that are associated with a given Role. Semantically, this is interpreted as defining the Role(s), at least one of which a principal must possess to access the specified methods. Similarly, the permission policies for servlets and JSPs are specified in a "Security-Constraint" descriptor and an "Auth-Constraint" descriptor. AuthConstraint defines the Role(s), at least one of which a principal must possess to access the web resources and methods specified in a corresponding "Web-Resource-Collection" descriptor.

The Roles pertaining to a J2EE application, which can be referenced within a role-reference (which may, for example, specify that internally-coded references to the role "Manager" are to be interpreted as those users granted the role named "Supervisor"), method-permission, or auth-constraint descriptor for components within the application, are declared separately in "Role" descriptors. When the application is deployed, the Roles specified for a J2EE application are mapped by the application deployer to specific privilege attributes (which are typically associated with one or more users, user-groups, etc.) which have been previously defined within the deployed information system. This mapping is retained by the J2EE platform and traversed at run-time when evaluating access checks and Role associations. The prior art implementation of the J2EE Roles-based authorization model is referred to herein as a "Roles-Privilege" model. (This is to be contrasted with the "Roles-Permission" interpretation of the J2EE authorization model which is disclosed herein.)

Figure 2:
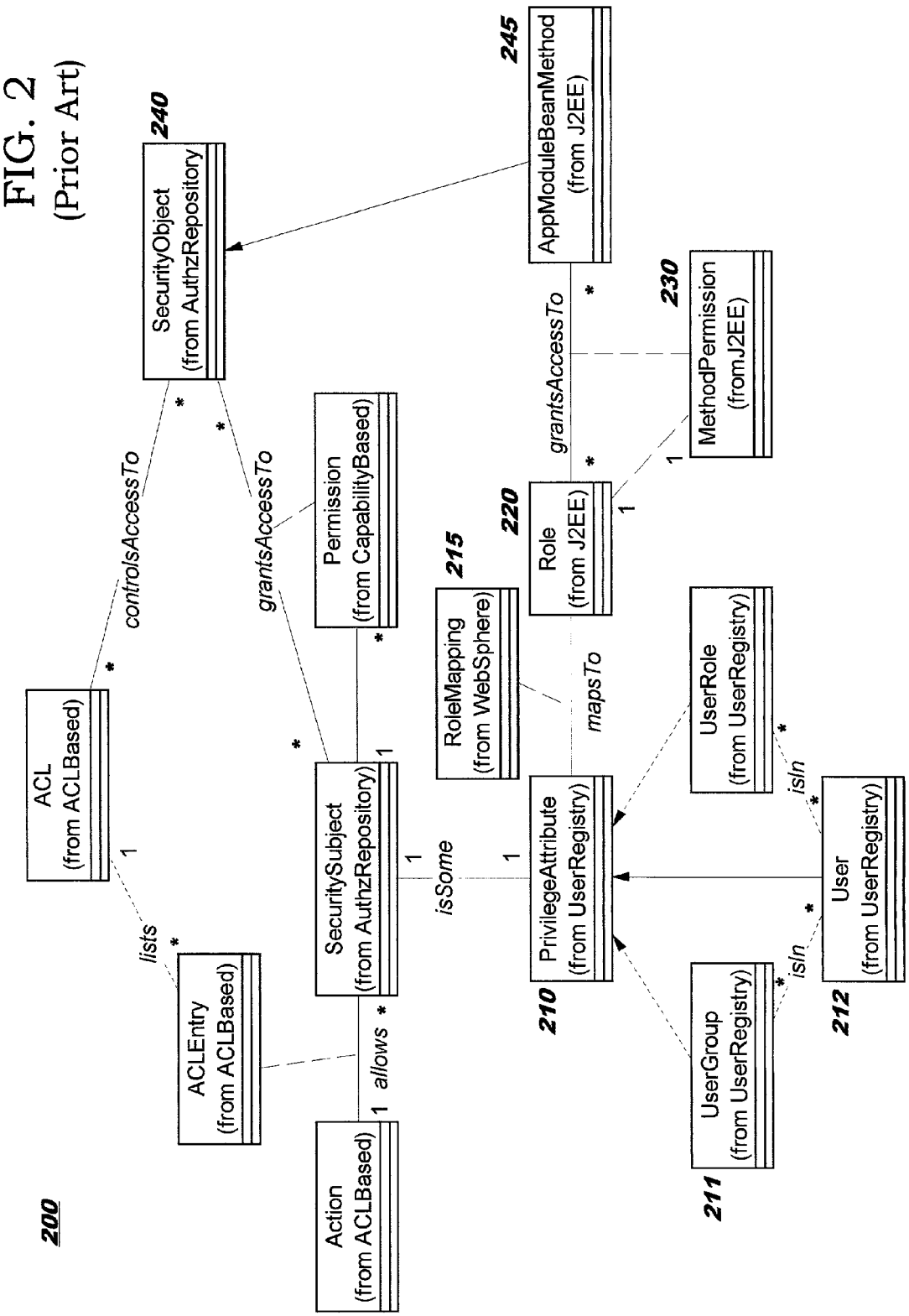
FIG. 2 provides a diagram illustrating a role-privilege security model which may be used to administer security policy according to the prior art.

A complete logical object model 200 for the prior art Roles-Privilege interpretation of the J2EE security model is shown in FIG. 2 using the Unified Modeling Language, or "UML", notation. (UML is a standard of the Object Management Group, and is described in "UML Toolkit", H. Eriksson, M. Penker, published by John Wiley and Sons in 1997.) The Roles-Privilege interpretation treats Roles defined in the J2EE application as a privilege attribute. See elements 210 and 220 of the model in FIG. 2. This privilege attribute is associated with users and user groups. See elements 212 and 211 of FIG. 2, respectively. The Roles label can be mapped to one or more subjects (i.e. users, user-groups, etc.) which have been defined in the enterprises' information system. See element 215 of FIG. 2. In this prior art approach, the J2EE components, and their complete list of methods, are registered as security objects. See elements 240 and 245 of FIG. 2. The method-permission descriptors 230 are then used to establish a set of default access policies. When the application is deployed, the Roles in the method-permission are resolved (through their respective mappings) to their corresponding subject(s), and each subject is granted access to the set of methods defined in the method-permission. At run-time, the privilege attributes of the requesting principal are used to test whether the corresponding subject has been granted access to the method being invoked.

The prior art approach depicted in FIG. 2 has the advantage of being similar to traditional authorization models for information systems, and is therefore familiar and intuitive to the typical security administrator. However, having to create a security object entry for every resource—for example, for every method on every bean—in every J2EE application deployed in the enterprise can pose a significant scalability and manageability problem. This problem adversely affects the underlying authorization repository, which may grow to a very large size (and therefore consume significant storage space) and which may also become a processing bottleneck. In addition, this approach also represents a significant usability, and therefore integrity, problem for the administrator: as stated earlier, the administrator is unlikely to be able to understand, and thus to efficiently administer, the overall security policy of an enterprise when using this approach.

To illustrate the problem facing the administrator using the approach of FIG. 2, consider that a bean can often have 50 or more methods, a J2EE application can commonly contain 1000 or more beans, and there may be hundreds of J2EE applications deployed in a given enterprise. Such an environment could easily result in 5,000,000 or more entries in the security object space. It is theoretically possible to automatically create the authorization policies in the authorization repository using the method-permission descriptors for each application; however, an automated approach can only, at best, represent a default policy. The administrator is still required to evaluate the defaults being selected and ensure they meet the over-arching security policies of the enterprise. Moreover, if those policies should ever change, the administrator must traverse through all of the defined policies and update them.

FIG. 3 illustrates a data structure which is conceptually used to implement the approach of managing the Roles-Privilege implementation of FIG. 2. (While a table is used in FIG. 3 and also in FIGS. 5 and 6, this is merely representative of one form of data structure that may be used.) The example table in FIG. 3 illustrates protecting access to four resources, which are: (1) a "getBalance" method on an "Account" EJB; (2) a "deposit" method on the Account EJB; (3) a "closeAccount" method on the Account EJB; and (4) an "HTTP_GET" invocation of a servlet named "AcctServlet". According to the information in this table, access to these resources has been granted to four different (user) groups, which in this example are: (1) a "Teller" role; (2) a "Cashier" role; (3) a "Super" (i.e. Supervisor) role; and (4) a "WebTeller" role. (It is important to note that the Role name used in this prior art approach is also the name of a group in the system. Therefore, for every security role defined in J2EE, there must be an identically-named group defined in the system. If one does not exist, then the administrator is required to create a group for every role defined in the enterprise applications.) As indicated by the entries in the table, the getBalance method can only be accessed by users associated with the Teller and Cashier group, and the deposit method can only be accessed by users associated with the Teller group; the closeAccount method is only available to users associated with the Super group, and the HTTP_GET invocation of the AcctServlet is only available to users associated with the WebTeller group.

To further explain the prior art approach, suppose that the prior art Roles-Privilege model is being used to administer security policy for an online banking application. A number of roles are defined, and user groups are associated with these roles. For example, the roles described above with reference to FIG. 3 include "Teller" and "Super". Each person who is authorized to access this application is classified as to their role or roles and then associated with the corresponding user group or groups. Suppose that user "Bob" is a supervisor for a bank using this banking application. Associating Bob with the "Super" user group gives him access to those resources which are limited to the Super role. Bob may also be associated with the Teller group, in order to allow him to perform functions which are limited to the Teller role. The privilege aspect of the roles-privilege model associates a selected resource with a user group's named identity to a role which is granted access to that resource. (Exactly what is defined as a resource may vary widely from one application to another.) In the example of FIG. 3, supervisors are not allowed to access the getAccountBalance method, the deposit method, nor are they able to issue a GET request against the AcctServlet: users associated with the Super user group are only allowed to access the closeAccount method. As has been stated, this prior art approach limits access on a per-method or per-resource level, and if the defined policies for a resource should change, the mapping information associated with each EJB (or JSP or servlet) must then be modified to reflect the new policy. Also, for every application role notion, there needs to be an identically-named user group defined within the security subsystem.

In contrast to the prior art Roles-Privilege approach, the approach disclosed herein by the present invention defines Roles as the security objects to be administered. A Role is treated as a set of permissions, and thus this approach is referred to herein as a "Roles-Permission" interpretation of the J2EE security model. In preferred embodiments, the Role label defined in the method-permission descriptor is used as the name of a permission. The permission defines a resource (e.g. the bean for which the method-permission descriptor is defined) and a set of actions (e.g. the methods listed in the method-permission).

With reference to the online banking application, when using the techniques of the present invention, a permission in a first method-permission descriptor may specify actions of getBalance and deposit on the Account resource (i.e. the Account EJB). The corresponding Role label for these permissions, according to the table in FIG. 3, is Teller. A permission in a second method-permission descriptor may specify only the getBalance action on Account; the corresponding Role label for this permission is Cashier. Method-permission descriptors with Role labels of Super and WebTeller may be specified as well.

If there are multiple method-permission descriptors referring to the same Role, then according to preferred embodiments, these multiple descriptors are taken to contribute to the same role permission. For example, another method-permission description referring to Teller might be created which specifies the action of issuing a GET against the servlet identified as "finance/account". The combination of method-permission descriptors which refer to Teller then define the permissions which are granted to this role.

Figure 4:
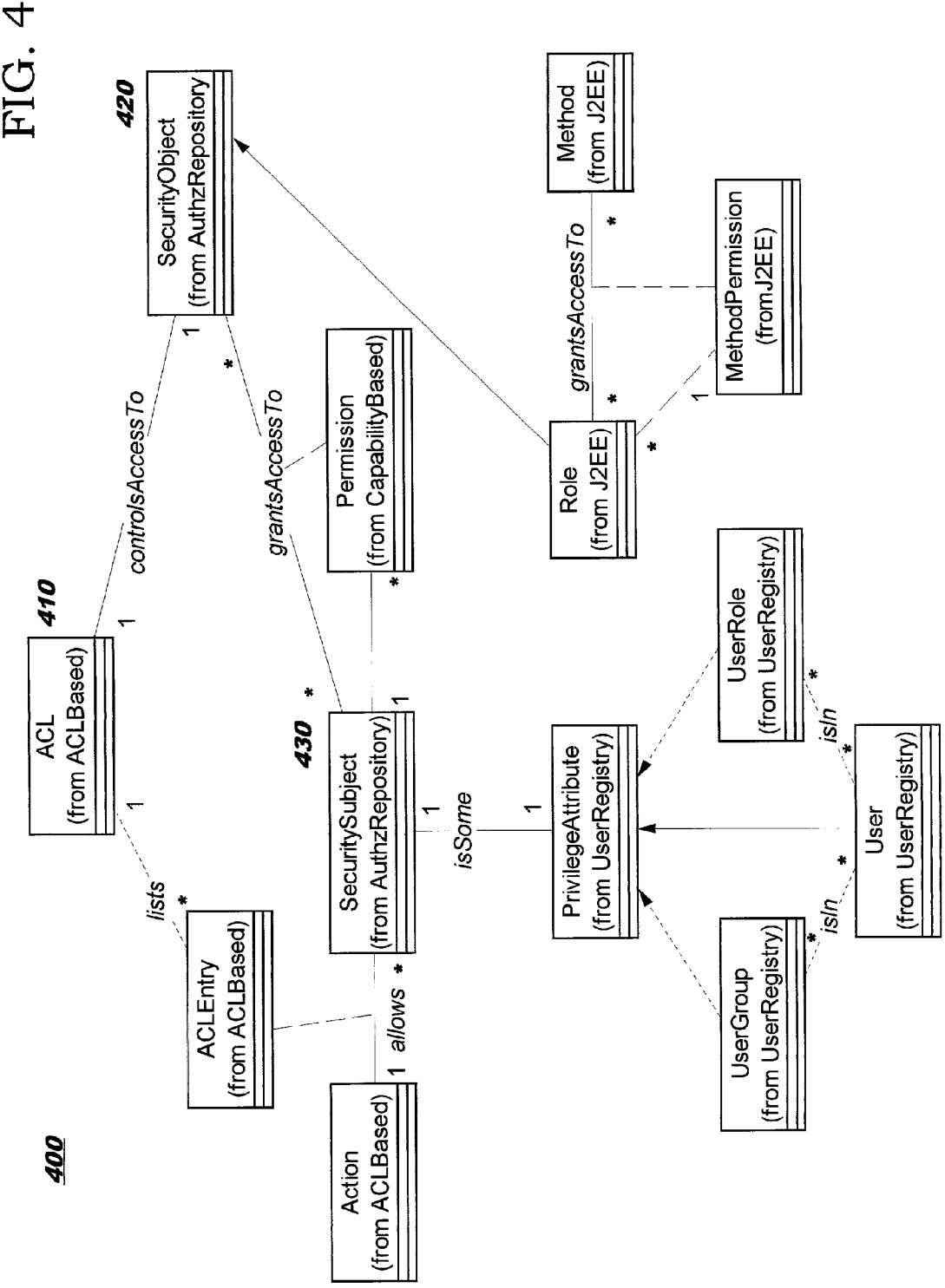
FIG. 4 provides a diagram illustrating an improved security model which may be used to administer security policy according to the present invention, and FIGS. 5 and 6 provide tables corresponding to the improved security model of FIG. 4.

The Role defined for the method-permission, according to the present invention, is not required to be mapped to an identically-named user group at deployment time as in the prior art approach (which maps Role to a user group, and therefore identifies the methods each user can access, as stated earlier): rather, the Role is defined as the security object in the authorization repository. FIG. 4 provides a logical object model 400 for this inventive Roles-Permission interpretation of the J2EE security model (again using the Unified Modeling Language). Element 420 illustrates the securityObject which now represents roles.

Separately, the security administrator can grant subjects (i. e. users, user-groups, etc.) to the Role permissions ostensibly by including the subject in access control list ("ACL") entries which are associated with the Role permission (i.e. with the securityObject), as illustrated by elements 410 and 420 of FIG. 4. (For example, if Mary is a manager and all other users previously associated with the supervisor group are considered managers, then an access control list which includes Mary and the supervisor group can be associated with the Manager security object.)

This model has the advantage of dramatically reducing the number of objects in the security object space (as contrasted to having each method defined in the security object space, as in the prior art). In particular, a J2EE application may typically define 20 or more Roles. As has been stated above, an enterprise will commonly have 100 or more J2EE applications installed in its production environment. Thus, a security policy administered according to the present invention needs to deal with setting and managing the authorization policies for 2,000 or more Roles—dramatically fewer than the 5,000,000 or perhaps even 50,000,000 or more resources that would be defined when using the prior art Role-Privilege model. This approach enables the administrator to deal with a higher-level abstraction, by grouping resources and the actions that can be performed on them, and is much more efficient and manageable: dealing with several thousand Roles is much more advantageous than dealing with millions of individual resources.

Using the approach of the present invention, security administrators define authorization policies for the Roles in their application (instead of for the methods, as in the prior art) and grant subjects (i.e. users and user groups) to the Roles. By extension, this specifies the methods, beans, and other resources to which access is permitted for these subjects.

FIG. 5 illustrates an example of a table 500 that represents the association of a Role to a set of permissions, and may be referred to equivalently as a "method permission" table or a "required roles" table. Based on the J2EE model, a method can be accessed by a user who has at least one of the roles associated with the method. The role(s) associated with a method is/are the set of required roles to perform the corresponding action. For the methods shown in columns of the table in FIG. 5, the rows indicate whether the corresponding role is granted access to that method. In this example table, the roles required to access the getBalance method on the Account bean are Teller or Cashier, and in order to access any URI that matches the pattern "/public/*", a "PublicRole" is required. Conversely, referring to the rows of this example table 500, the columns indicate the actions (i.e. permissions) which that role is granted. A subject is granted a role, and then has the permissions associated with that role. A subject will be allowed to perform a particular action if the subject's granted roles contain at least one of the required roles to perform that action. Thus, if a user Bob has been granted the role of Teller, then Bob is allowed to perform the actions of getBalance and deposit on Account beans, and is also allowed to issue a GET against the servlet identified as "finance/account".

Referring now to FIG. 6, an example of a table 600 that represents the association of a Role to subjects is shown. This table may be referred to equivalently as an "authorization table" or a "protection matrix". In such a table, the Role is defined as the security object, and users and groups are defined as security subjects. (See elements 420 and 430 of FIG. 4.) The columns of the table therefore identify those subjects which have a particular role, and the rows identify the roles for each of the subjects.

In an optional aspect of the preferred embodiments, in addition to users and groups, the security services provided by IBM's WebSphere product support two additional special pre-defined subjects, which are named "AllAuthenticatedUsers" and "Everyone". If a role is granted to the Everyone role, then all methods (or, generally, the permissions) associated with that role can be accessed by (or, generally, are granted to) anyone without requiring authentication. (This may be appropriate, for example, in a scenario such as the browsing of an online catalog which was previously discussed, wherein it is desirable to allow all interested users to browse the catalog and only to require authentication if the user decides to place an order.) If a role is granted to the AllAuthenticatedUsers role, then all the methods associated with that role can be accessed by any user as long as the user has authenticated successfully. (As an alternative to use of special pre-defined subjects, the "everyone" role could be omitted, and each user and/or user group could be explicitly granted the PublicRole.)

As shown in the sample table 600, user Bob and group "TellerGroup" have been granted the role of a Teller as well as the role of a WebTeller; group "CashierGroup" and user Bob have been granted the Cashier role; group "Supervisor" and user Bob have been granted the Super role; and the special subject "Everyone" has been granted the PublicRole.

Based on the information in the two example tables 500 and 600, Bob is authorized to access all of the depicted resources. Alternatively, if Bob is granted only the Teller and Cashier roles, then Bob is authorized to access only the getBalance and deposit methods on the Account bean, as well as the GET on/finance/account. He cannot access any other of the specified resources, however (except that he will be able to access any URI that matches the string "/public/*" because everyone has been granted that role).

Based on the J2EE model, an application assembler will associate the methods on resources to a set of required roles, as exemplified by the table 500 in FIG. 5. In preferred embodiments, this can be done using a commercially-available application assembly tool. The application deployer will then enforce the policies specified by the assembler when he installs the application into an enterprise environment. The deployer may also use the application assembly tool to redefine the security policies, if he or she thinks it is necessary, and then install the application into the enterprise environment. The method permission table exemplified by FIG. 5 may therefore be formed as a result of required roles getting specified through the process of application assembly. (This table or equivalent information may also be created in other ways, as will be obvious to one of skill in the art, without deviating from the scope of the present invention.)

Association of roles to subjects, as exemplified by the table 600 in FIG. 6, can be performed when the application gets installed in the enterprise, or alternatively at a later time as part of security administration. Users and groups can be granted any role during or after an application is installed in the enterprise.

In summary, the manner in which resources are protected according to the present invention involves the following steps for defining security policy:

1) One or more groups of desired actions on selected resources are identified. (With reference to the example table 500 of FIG. 5, one group of actions corresponds to the columns which have entries marked at the intersection with a particular row.)

2) Each group is assigned a name, where this name is a Role name.

3) Each Role name is defined to the security system as a security object.

4) Users and/or user groups are associated with Role names. (The association for a particular user or user group corresponds to a row in table 600 of FIG. 6.)

The following operations are then carried out at run-time to enforce the defined security policy:

1) A request is received to access a particular resource.

2) The required roles for that particular resource are determined (using the information from the method-permission descriptors). Steps 1 and 2 correspond logically to finding the column for this resource in table 500, and identifying the rows in which this column has marks or intersections.

3) Determining the invoking user or principal.

4) For each role located in Step 2, consulting the access control list associated with this role security object to determine whether this user/principal is a member of that list. Steps 3 and 4 correspond logically to finding the row for this user/principal in table 600, and identifying the columns in which this row has marks or intersections.

5) If the user/principal is a member of any list evaluated in Step 4, then this user/principal is authorized to access this resource; otherwise, this access request is a security violation and an error message is preferably generated.

By grouping permissions by roles for purposes of security policy administration, as disclosed herein, the administration process is made more efficient and less error-prone. Adding and removing new resources will no longer require changing the access control entries associated with those resources. Instead, resources (and the actions on them) can be added or removed directly from a role security object association without affecting the protection matrix (wherein users and user groups are associated with roles). Role assignments to users or user groups can therefore remain constant; application security policy changes simply affect what permissions are associated with the roles.

Using the prior art approach, if a permission should be granted to a pre-existing group, then this grant can only be achieved by (1) creating a grew group with the name of the role associated with the resource, and (2) associating the pre-existing group to be a member of the newly-created group. This requires support for nested groups in the underlying user registry. (For example, if a newly-installed application allows access to users who are members of a "Managers" group, but the enterprise has defined those users as being members of the "Supervisors" group, then the Supervisors group has to be made a child of a newly-created Managers group.) The technique of the present invention does not require support for nested.

Preferred embodiments have been described herein with reference to specifying permissions for accessing methods of EJBs and servlets, and for determining which methods can be accessed from JSPs and URI references. Note that this is for purposes of illustration and not of limitation. The disclosed techniques may be used advantageously in many scenarios. A collection of discrete permissions is simply grouped and assigned a name, and this name can then be associated with a subject to determine who has the collected permissions. Examples of alternative scenarios in which the present invention may be used advantageously include: associating the permission to access a particular row (or, alternatively, a particular column) of a database table with a specific role to indicate what subjects can access values from that row; associating the permission to access function calls or APIs within a messaging system such as IBM's MQI to a specific role; associating the permission to delete a selected file on a remote server to a specific role; and so forth. In general, any resource and/or any action on any resource can be protected using the techniques which have been disclosed.

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowcharts and/or block diagrams of methods, apparatus (systems) and computer program products according to embodiments of the invention. It will be understood that each flow and/or block of the flowcharts and/or block diagrams, and combinations of flows and/or blocks in the flowcharts and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart flow or flows and/or block diagram block or blocks.

While the preferred embodiments of the present invention have been described, additional variations and modifications in those embodiments may occur to those skilled in the art once they learn of the basic inventive concepts. Therefore, it is intended that the appended claims shall be construed to include both the preferred embodiments and all such variations and modifications as fall within the spirit and scope of the invention.

What is claimed is:

1. A computer-implemented method for enforcing role-permission security administration using security objects stored in a security repository, comprising steps of:
   storing, in a security repository, a plurality of security objects, wherein each of the security objects corresponds to a single role;
   specifying, in each of the security objects, all permissions granted to the corresponding role, wherein each of the specified permissions identifies at least one resource and, for each resource, at least one action that can be performed on the resource by subjects granted the corresponding role, wherein selected ones of the resources are identified in the specified permissions of more than one of the security objects and wherein the specified permissions for at least one of the security objects identifies a plurality of resources and for each of the plurality of resources, at least one of the actions; and
   using the stored security objects to determine whether run-time requests for performing actions on the resources can be granted.

2. The method according to claim 1, where the using step further comprises, for each of the run-time requests, the steps of:
   determining, forte run-time request, a requester from which the request was received, and a particular action being requested on a particular resource;
   determining one or more roles granted to the requester; and
   until determining that the request can be granted or exhausting the determined roles, iteratively accessing the security object corresponding to each one of the determined roles and if the accessed security object identifies the requested action on the requested resource, then determining that the request can be granted.

3. The method according to claim 2, wherein the step of determining one or more roles further comprises the steps of:
   using an identification of the requester as a user identification to consult a mapping that specifies, for each of a plurality of subjects, one or more roles associated therewith, wherein each of the subjects is specified as at least one of (1) an identification of one or more users and (2) an identification of one or more user groups, thereby determining each role associated with the identification of the requester;

determining one or more user groups of which the requester is a member; and using each of the determined user groups as a user group identification to consult the mapping, thereby determining each role associated with the determined user groups.

4. The method according to claim 1, where the using step further comprises, for each of the run-time requests, the steps of:

determining, for the run-time request, a requester from which the request was received, and a particular action being requested on a particular resource; and determining that the run-time request can be granted only if the requester has been granted at least one of the roles which is required, according to the stored security objects, to perform the requested action on the requested resource.

5. A system for enforcing role-permission security administration using security objects stored in a security repository, comprising:

a security repository for storing a plurality of security objects, wherein each of the security objects corresponds to a single role;

means for specifying, in each of the security objects, all permissions granted to the corresponding role, wherein each of the specified permissions identifies at least one resource and, for each resource, at least one action that can be performed on the resource by subjects granted the corresponding role, wherein selected ones of the resources are identified in the specified permissions of more than one of the security objects and wherein the specified permissions for at least one of the security objects identifies a plurality of resources and for each of the plurality of resources, at least one of the actions; and means for using the stored security objects to determine whether run-time requests for performing actions on the resources can be granted.

6. The system according to claim 5, where the means for using further comprises means for performing, for each of the run-time requests, steps of:

determining, for the run-time request, a requester from which the request was received, and a particular action being requested on a particular resource;

determining one or more roles granted to the requester; and until determining that the request can be granted or exhausting the determined roles, iteratively accessing the security object corresponding to each one of the determined roles and if the accessed security object identifies the requested action on the requested resource, then determining that the request can be granted.

7. A computer program product for enforcing role-permission security administration using security objects stored in a security repository, the computer program product comprising computer-readable code embodied on one or more computer-usable media, the computer-readable code comprising instructions that when executed on a computer cause the computer to:

store, in a security repository, a plurality of security objects, wherein each of the security objects corresponds to a single role;

specify, in each of the security objects, all permissions granted to the corresponding role, wherein each of the specified permissions identifies at least one resource and, for each resource, at least one action that can be performed on the resource by subjects granted the corresponding role, wherein selected ones of the resources are identified in the specified permissions of more than one of the security objects and wherein the specified permissions for at least one of the security objects identifies a plurality of resources and for each of the plurality of resources, at least one of the actions; and use the stored security objects to determine whether run-time requests for performing actions on the resources can be granted.

8. The computer program product according to claim 7, where the instructions that cause the computer to use the stored security objects further comprise instructions that cause the computer, for each of the run-time requests, to:

determine, for the run-time request, a requester from which the request was received, and a particular action being requested on a particular resource; and determine that the run-time request can be granted only if the requester has been granted at least one of the roles which is required, according to the stored security objects, to perform the requested action on the requested resource.

9. The method according to claim 1, wherein at least one of the resources is an executable method.

10. The method according to claim 1, wherein at least one of the resources is a column of a database table.

11. The method according to claim 1, wherein at least one of the resources is a row of a database table.

12. The method according to claim 1, wherein at least one of the resources is a file and each of the at least one actions identified for the at least one resource are file access operations that can be performed on the file.

13. The method according to claim 1, wherein at least one of the resources is a function call to a function of an executable program.

14. The method according to claim 1, wherein at least one of the resources is an Enterprise JavaBean ("EJB") and each of the at least one actions identified for the at least one resource are methods that can be performed on the EJB.

15. The method according to claim 1, wherein at least one of the resources is a servlet and each of the at least one actions identified for the at least one resource are methods that can be performed by the servlet.

16. The method according to claim 1, wherein at least one of the resources is a Uniform Resource Identifier ("URI") and each of the at least one actions identified for the at least one resource are methods which reference the URI.

17. The method according to claim 1, wherein at least one of the resources is a JavaServer Page ("JSP") and each of the at least one identified for the at least one resource are methods referenced from the JSP.

18. The method according to claim 1, wherein at least one of the resources is any resource that is expressible to the security system and each of the at least one actions identified for the at least one resource are selected from a set of actions that are permitted on that resource.

* * * * *